United States Patent [19]
Hildreth et al.

[11] Patent Number: 5,634,794
[45] Date of Patent: Jun. 3, 1997

[54] AIRCRAFT SIMULATOR AND METHOD

[75] Inventors: Bruce L. Hildreth, Lexington Park, Md.; Thomas L. Trankle, Cupertino, Calif.; William A. Hart, Lexington Park, Md.; Upton T. Norris, III, Hollywood, Md.; Roger E. Eyermann, Waldorf, Md.

[73] Assignee: Systems Control Technology Inc., California, Md.

[21] Appl. No.: 409,068

[22] Filed: Mar. 23, 1995

Related U.S. Application Data

[62] Division of Ser. No. 34,762, Mar. 19, 1993, Pat. No. 5,435,729, which is a division of Ser. No. 604,479, Oct. 29, 1990, Pat. No. 5,209,661.

[51] Int. Cl.$^6$ .............................. G09B 9/08; G09B 19/16
[52] U.S. Cl. .................................... 434/37; 434/45
[58] Field of Search ............................ 434/29, 30, 45, 434/53, 55, 56, 59, 61, 365, 37, 372; 364/578; 244/223; 73/862.05; 280/707; 180/197

[56] References Cited

U.S. PATENT DOCUMENTS

| | | | |
|---|---|---|---|
| H703 | 11/1989 | Repperger et al. . | |
| 2,808,659 | 10/1957 | Dehmel | 434/45 |
| 3,220,121 | 11/1965 | Cutler | 434/45 |
| 3,463,866 | 8/1969 | Staples . | |
| 3,568,572 | 3/1971 | Steinmetz | 434/45 |
| 4,227,319 | 10/1980 | Gut et al. | 434/45 |
| 4,236,325 | 12/1980 | Hall et al. | 434/45 |
| 4,236,685 | 12/1980 | Kissel . | |
| 4,398,889 | 8/1983 | Lam et al. | 434/45 |
| 4,427,388 | 1/1984 | Hope . | |
| 4,463,605 | 8/1984 | McDowell et al. | 434/31 X |
| 4,504,233 | 3/1985 | Galus et al. | 434/45 |
| 4,603,388 | 7/1986 | Griffith et al. . | |
| 4,670,843 | 6/1987 | Matsumura et al. . | |
| 4,691,694 | 9/1987 | Boyd et al. . | |
| 4,800,721 | 1/1989 | Cemenska et al. . | |
| 4,889,108 | 12/1989 | Bond et al. . | |
| 4,939,655 | 7/1990 | Majeed et al. . | |
| 4,947,697 | 8/1990 | Prentice . | |
| 5,056,038 | 10/1991 | Kuno et al. . | |
| 5,058,017 | 10/1991 | Adachi et al. . | |

FOREIGN PATENT DOCUMENTS

| | | |
|---|---|---|
| 0051896 | 5/1982 | European Pat. Off. . |
| 0265738 | 5/1988 | European Pat. Off. . |
| 0413656 | 2/1991 | European Pat. Off. . |
| 2132964 | 7/1984 | United Kingdom . |
| 88/00545 | 1/1988 | WIPO . |

OTHER PUBLICATIONS

German Text Book — Follinger, O., "Regelungstechnik", Elitera–Verlag, Berlin, (2d Ed. 1978, pp. 208–209 and 322–325).

*Primary Examiner*—Joe Cheng
*Attorney, Agent, or Firm*—Cushman, Darby & Cushman

[57] ABSTRACT

An apparatus and method for simulating a desired response in accordance with an external applied force. The apparatus includes a member which is responsive to the applied force, an actuator coupled to the member for exerting a torque on the member, a force sensor for detecting the applied force, and a torque sensor for detecting the torque exerted by the actuator. Signals from the force sensor are used to determine the system response based upon a desired relation. The force sensor signals also are used to determine the actual system response based upon the physical characteristics of the apparatus. The detected torque is compared with the desired and the actual system response, and as a result of the comparison the torque exerted by the actuator onto the member is adjusted accordingly so that the member performs the desired system response. The actuator is preferably an electric motor so that the apparatus can simulate any desired response, notwithstanding the physical characteristics of the system.

9 Claims, 11 Drawing Sheets

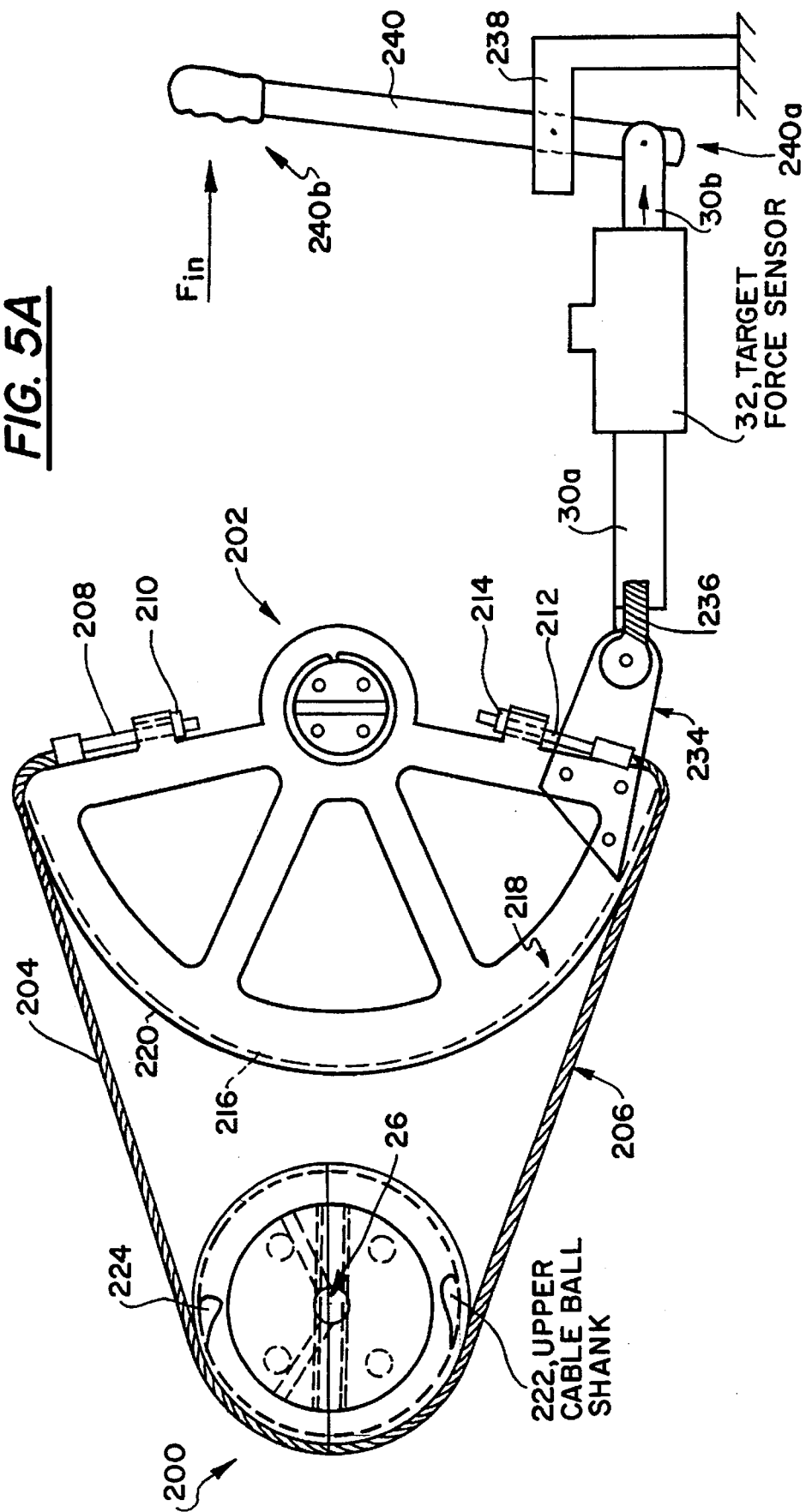

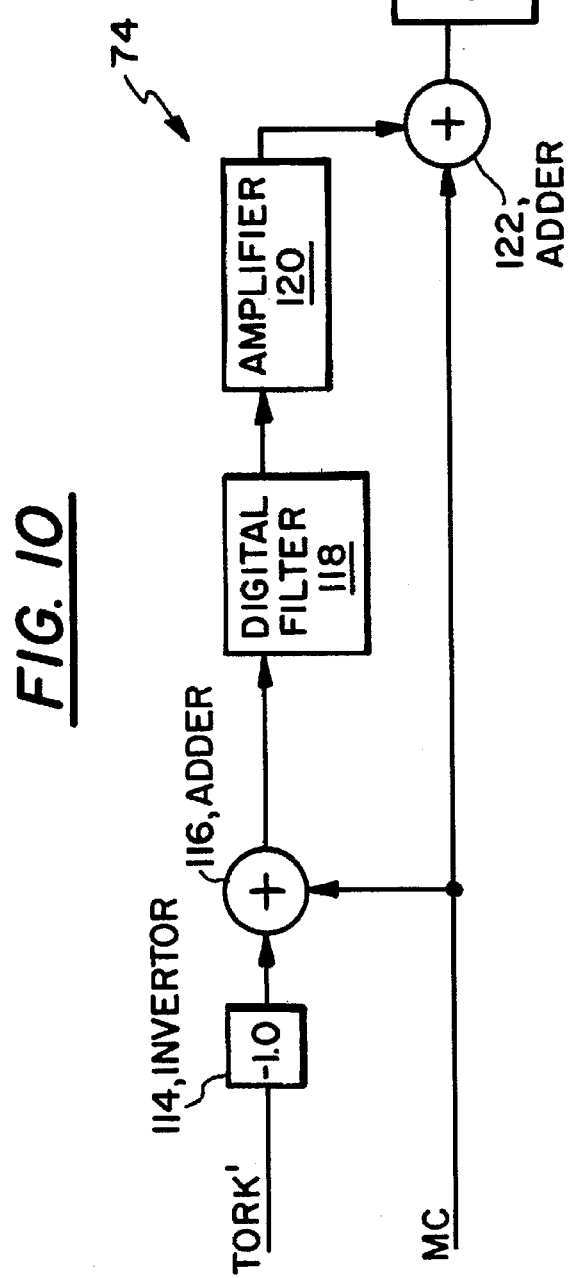

AIRCRAFT SIMULATOR AND METHOD

This is a division of application Ser. No. 08/034,762, filed Mar. 19, 1993, now U.S. Pat. No. 5,435,729, which is a division of application Ser. No. 07/604,479, filed Oct. 29, 1990, now U.S. Pat. No. 5,209,661.

BACKGROUND OF THE INVENTION

1. Field of the Invention

The present invention relates to control loader systems and methods which apply a load in response to a detected force. Specifically, this invention relates to a control loading system and method for generating a desired dynamic load such as may be employed in an aircraft flight simulation system.

2. Description of the Related Art

The need for controlling a motor or actuator in response to external parameters exists in production systems, robotics, and simulation systems, among others. The control of such actuators is critical not only in the static environment, but also in the dynamic environment, where an actuator's response varies as a function of the acceleration, velocity and position of the load coupled to that actuator.

A classic need for dynamic control of actuators is found in simulators, such as aircraft flight simulators. In aircraft flight simulators, a pilot will move a control stick in response to various visual and auditory stimuli. Since the goal of such simulation systems is to generate the apparent realism of the simulation, the dynamic response (e.g., the "feel") of the control stick must correspond to the vehicle, whether it be a helicopter, a commercial jet airplane, or a military aircraft.

Conventional flight simulators apply a controlled load on a target, such as a control stick and associated linkage, by using a force sensor located between an actuator of the simulator and the target. A diagram of such a prior art control loader is shown in FIG. 1. A hydraulic actuator 10 secured to a substrate 12 exerts a force in response to a control signal supplied to the hydraulic actuator 10 from a controller 18. A pilot force sensor 14 is coupled between the hydraulic actuator 10 and the load target 16 to which the actuator force is to be applied. The load target 16 includes, for example, a pilot stick, and the mechanical linkage associated with coupling the pilot stick and the pilot force to the pilot force sensor 14. At the same time, a pilot is also applying a force to the target.

In operation, the hydraulic actuator 10 exerts a force in response to the control signal from the controller 18. The force from the hydraulic actuator 10 is applied to one side of the pilot force sensor 14 which transmits the force of the hydraulic actuator 10 to the load target 16. Because the pilot force sensor 14 is coupled to the load target 16 to which a pilot may also be applying a force, the load target 16 exerts a reaction force upon the pilot force sensor 14. The force generated across the pilot force sensor 14 is output to the controller 18, which provides an appropriate control signal output to the hydraulic actuator 10 in response to the detected force. As a result, by establishing a predetermined system response characteristic in the controller 18, the control loader of FIG. 1 responds to the forces exerted on the load target 16 in an attempt to simulate, for example, the load exerted by an aircraft upon its pilot control stick in response to the load exerted by the pilot on the stick.

A fundamental problem in the conventional arrangement shown in FIG. 1 is that the pilot force sensor 14 is unable to distinguish between the force exerted by hydraulic actuator 10 and the force exerted by the pilot on the load target 16. The overall system response will be affected by limitations of the hydraulic actuator 10, the mechanical couplings, and system factors such as inertia, damping, vibration, and forces which, like a spring, are dependent upon relative position. In a static system (e.g., the hydraulic actuator 10 and the load target 16 have no acceleration), the systemic limitations are not apparent so that the controller 18 is able to accurately control the system.

In a dynamic system, in which forces applied to the load target are changing, because the force exerted by the hydraulic actuator 10 cannot be distinguished from the force exerted by the pilot, the system of FIG. 1 cannot correct for systemic limitations such as inertia, damping, and vibration within the hydraulic actuator 10 or its associated mechanical linkages. As a result, the dynamic response is poor, and any attempts to use the prior art system in an aircraft simulator results in an aircraft control stick which gives a poor "feel" to the pilot who moves the control stick.

The control loader of FIG. 1 has the additional problems associated with using the hydraulic actuator 10. The hydraulic system tends to develop leaks, thus affecting the reliability and accuracy of the system. Attempts have been made to replace the hydraulic system with a motor, but because the pilot force sensor 14 is unable to distinguish between the force exerted by the motor and external forces acting on the load target, problems arise in eliminating ripple caused by the motor.

A further disadvantage to the prior art system is that because the controller 18 cannot compensate for the inertia or damping in the hydraulic actuator 10 or the associated mechanical linkages, the prior art system cannot be used for simulator systems wherein the stick of the aircraft being simulated has less inertia than the simulator's mechanism. This is because the prior art control loader system cannot take into account its own inertia. For example, while the system of FIG. 1 may be adequate to simulate a military fighter craft, which has a relatively heavy "feel", the inertia of the system may be too great for simulating a helicopter, which has a relatively light "feel". Consequently, different control loading systems are required having force and inertial characteristics which match the desired application.

SUMMARY OF THE INVENTION

It is highly desirable to provide a control loader system which can effectively and accurately generate a dynamic load upon a target object. Accordingly, it is an object of the present invention to provide a control loader and load control method which accurately generate a desired dynamic load upon a target object in response to other dynamic forces exerted on the target object.

It is a further object of the present invention to provide a control loader system and method which compensate for the system's inherent dynamic characteristics, such as inertia, damping, ripple and vibration, in order to accurately generate a desired dynamic load upon a target object.

It is still a further object of the present invention to provide a computer-controlled loading system and method which can generate complex responses regardless of the system's mechanical limitations. Such a computer-controlled loading system would enable, for example, accurate and consistent testing of design criteria during manufacture of mechanical systems.

The present inventors have realized that the dynamic forces within a control loader system can be effectively detected by using two force sensors to separately detect the force or torque generated by an actuator and an external force applied to a load target, such as the force exerted by a pilot on a control stick in an aircraft simulator. By separately measuring the torque generated by an actuator and the force exerted by a pilot, the control loader system and method of the present invention can detect the response of the actuator and control the actuator separately from the dynamic response of the load target, e.g., the actions of the pilot. As a result, the present invention can correct for the system factors such as inertia, damping, vibration and ripple torque.

In addition to correcting for system factors, the present invention enables the actuator to overcome the inertia of the load to provide a system which appears to have an actual mass less than the actual mass. For example, while a pilot stick in a simulator has an actual mass of 10 kilograms, the present invention can "help" the pilot overcome the actual mass of the pilot stick so that the apparent mass of the pilot stick becomes zero or any other desired value.

These features of the present invention present invention are accomplished by providing a control loader and method for exerting a controlled force on a load target, the control loader having an actuator, preferably an electric motor, a first force sensor, a second force sensor, and a control portion for controlling the electric motor in response to the first and second sensors. The first force sensor is disposed to detect the external force exerted on the load target and is coupled to the mechanical linkages which transmit the forces from the actuator to the load target. The second force sensor is connected to the actuator and is also secured to a substrate, so that the actuator is secured by the second force sensor to the substrate. As a result, the second force sensor can measure the force or torque generated by the actuator.

The control portion includes a desired response model for the control loader system. The signals from the first and second force sensors are input to the control portion, and the control portion generates a control signal to the actuator so that the actuator provides the desired response.

Since the present invention measures both the external force applied to the load target and the torque generated by the actuator, the control portion can accurately determine the control signals necessary to ensure the actuator generates the desired dynamic response. As a result, the present invention not only corrects for system limitations, but also enables the actuator to generate any desired response.

BRIEF DESCRIPTION OF THE DRAWINGS

The features of the present invention will become more apparent from the following detailed description of a preferred embodiment and the accompanying drawings, of which:

FIGS. 5A, 5B and 5C show a schematic views of the mechanical linkage between the control stick sensor and the motor;

FIG. 10 shows a block diagram of a torque compensator of the control portion of FIG. 6.

DETAILED DESCRIPTION OF THE PREFERRED EMBODIMENT

Figure 1:
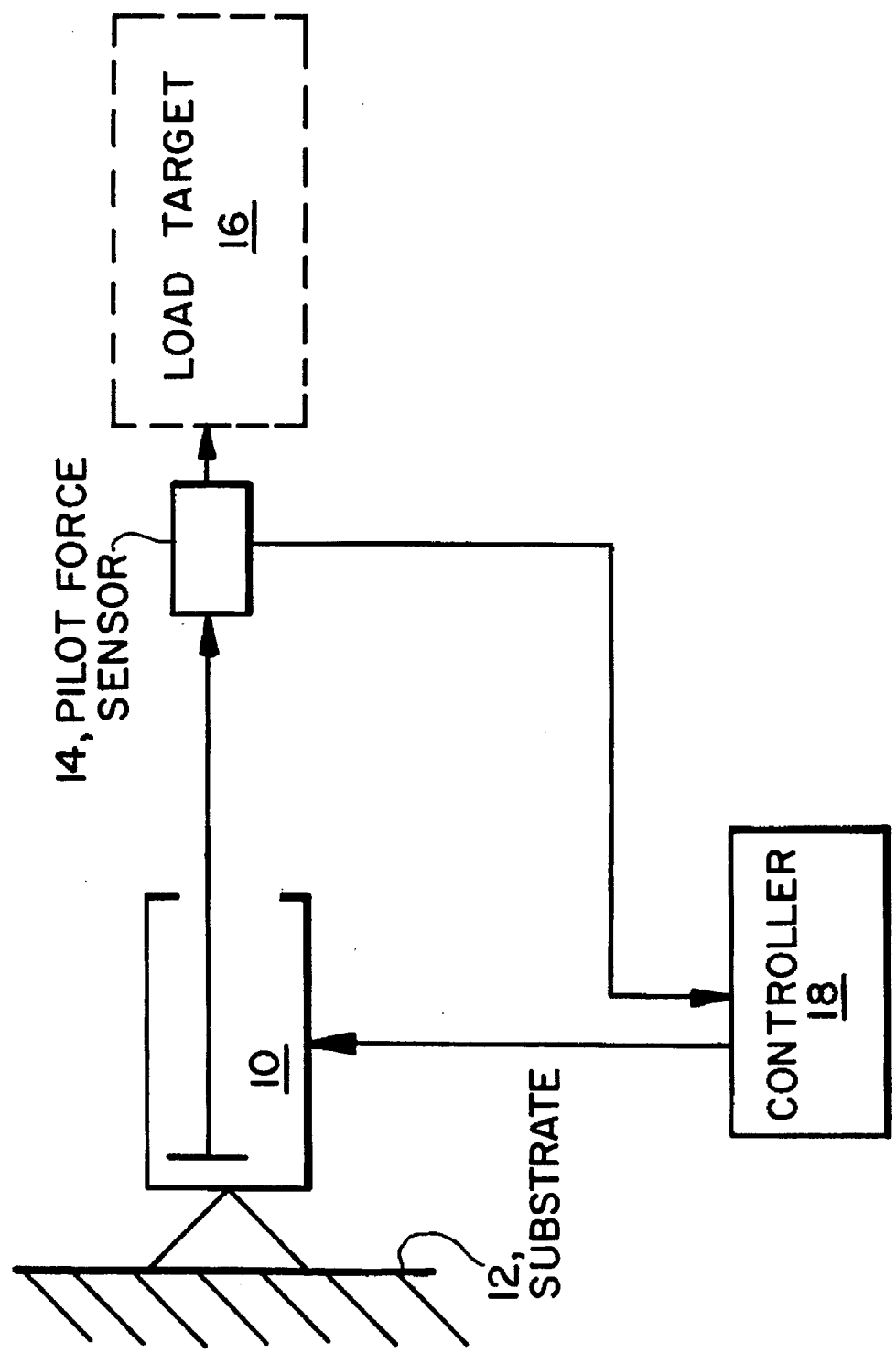
FIG. 1 shows a block diagram of a conventional control loader.

A detailed description of the preferred embodiment is disclosed, whereby identical reference numerals designate similar parts throughout.

Figure 2:
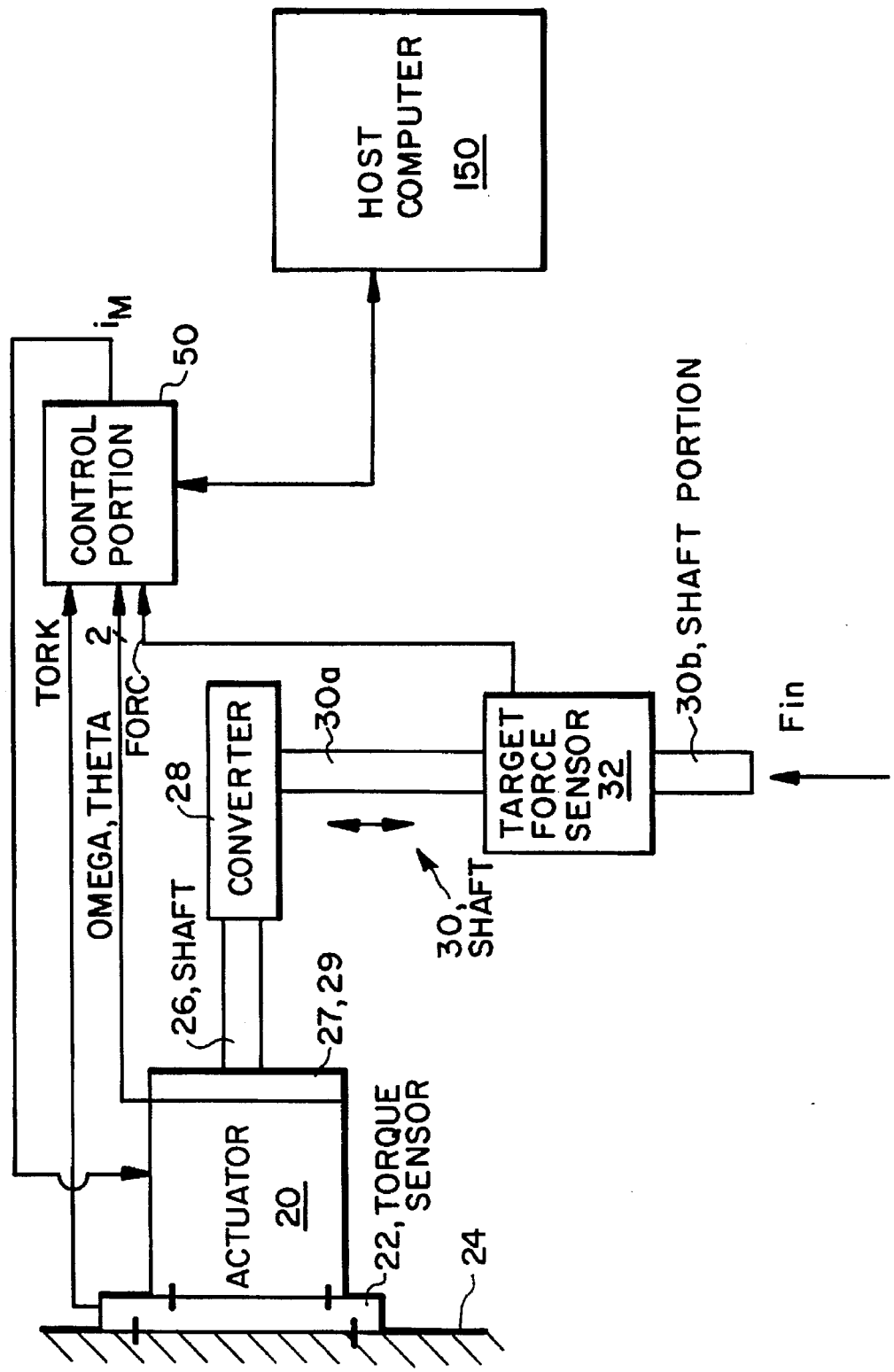
FIG. 2 shows a block diagram of a preferred embodiment of the present invention.

FIG. 2 discloses a block diagram of a preferred embodiment of the present invention. An actuator 20 is mounted to a torque sensor 22, which is in turn mounted onto a substrate 24. The substrate 24 may be a structure or, preferably an outer housing for the control loader of the present invention. The actuator 20 is preferably an electric motor, but may also be a hydraulic actuator. The torque sensor 22 in this embodiment is a strain gauge which measures torque, but the embodiment may be modified to measure force. The actuator 20 has a shaft 26 rotatably coupled to the actuator 20. The shaft 26 is coupled to a converter 28, which translates the rotary motion of the shaft 26 to a linear motion on a member, such as a shaft 30. The converter 28 may be either a gear system, a pulley/cable system, or a lever arm.

The shaft 30 is attached to a target force sensor 32, which measures the force $F_{1N}$ exerted externally on a load target attached to a shaft portion 30b, such as a pilot control stick in a simulator. The target force sensor 32 may be, for example, a tension/compression load cell which is known to those skilled in the art. The torque sensor 22 outputs a signal TORK corresponding to the detected torque to a control portion 50, and the target force sensor 32 outputs to the control portion 50 a signal FORC corresponding to the detected force $F_{1N}$.

The actuator 20 preferably includes an angular position sensor 27 and an angular velocity sensor 29 for detecting the relative angular position and velocity of the shaft 26, respectively. The position and velocity of the may be detected by using, for example, a resolver on the end of the shaft 26 coupled to the actuator 20. The actuator 20 outputs a signal OMEGA corresponding to the angular velocity and a signal THETA corresponding to the angular position. The signals OMEGA and THETA are input to the control portion 50.

The control portion 50 is preferably a computer or some other microprocessor-based system. The control portion 50 may be stand-alone or may be connected to a host computer 150. The host computer 150 enables storage of the sensor signals to be able to playback the performance of the actuator system. Thus, if the control loader of the present invention is used to control a pilot stick in a flight simulation, the host computer 150 would be able to recreate the pilot's responses. Also, any of a number of controls schemes can be down-loaded from the host computer 150 to the control portion 50.

The control portion 50 outputs a control signal to the actuator 20 in response to the force signals TORK, FORC, and also the velocity and position signals OMEGA and THETA. The control portion 50 is described in more detail below with reference to FIG. 7.

Figure 3:
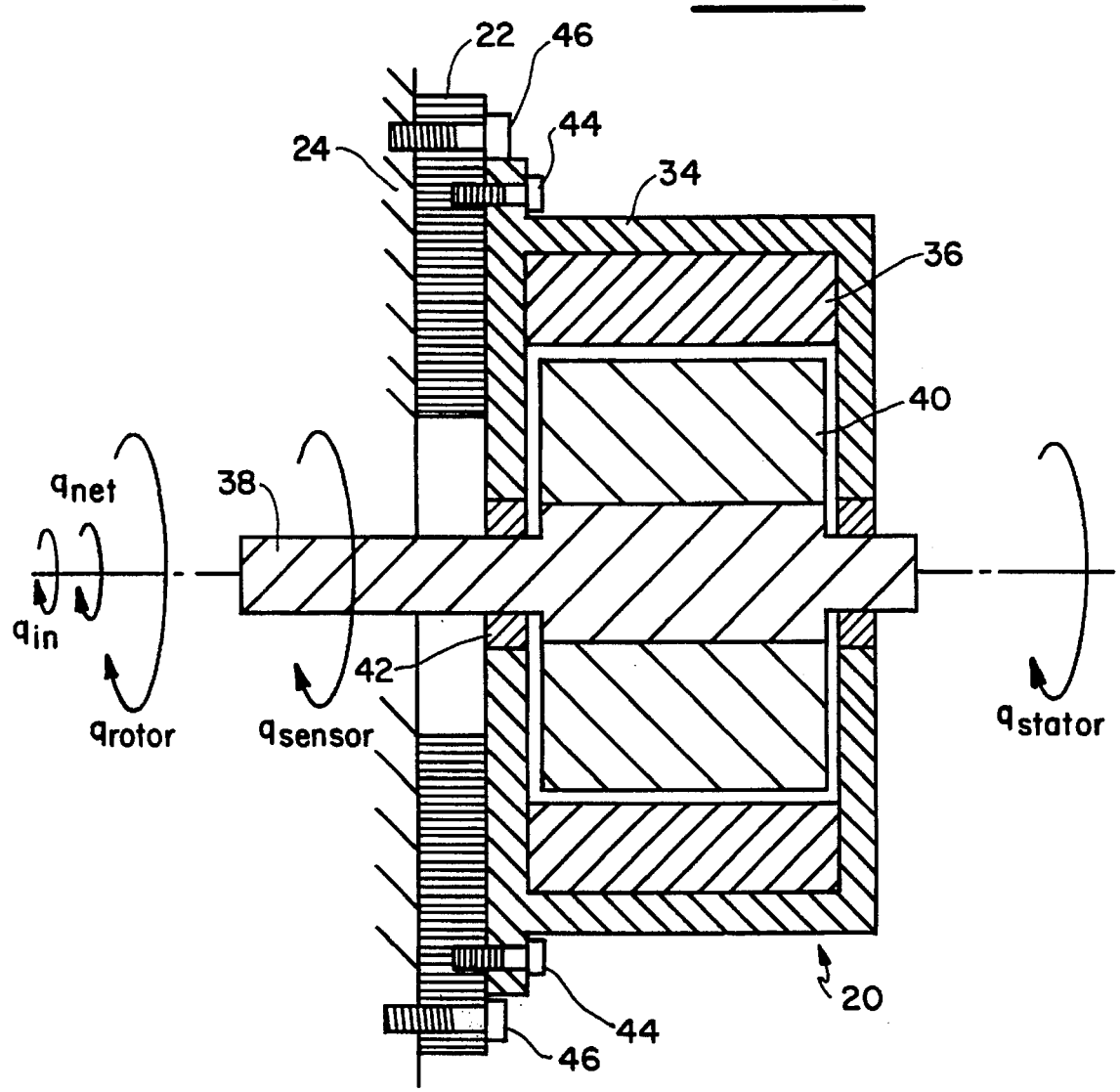
FIG. 3 shows a schematic cutaway view of a motor coupled to a motor torque sensor according to the present invention.

FIG. 3 shows a cutaway view of the actuator 20 and the torque sensor 22 disclosed in FIG. 2. The actuator 20 is an electric motor including a motor housing 34, a stator 36 fixed to the motor housing 34, a motor shaft 38, and a rotor 40 fixed to the motor shaft 38. The motor shaft 38 is rotatably coupled to the motor housing 34 by a pair of motor bearings 42. Thus, since the rotor 40 is rigidly fixed to the motor shaft 38, the motor shaft 38 rotates with the rotor 40. Motor shaft 38 is coupled to the shaft 26.

The actuator 20 is rigidly fixed to the torque sensor 22 by mounting bolts 44. In addition the torque sensor 22 is rigidly fixed to the substrate 24 by mounting bolts 46. Since the torque sensor 22 is rigidly fixed between the substrate 24 and the actuator 20, the torque sensor 22 will detect any torque exerted by the actuator 20. In other words, since a mass exists between the torque sensor 22 and force sensor 32, the torque sensor 22 will detect any torque exerted by the actuator 20.

Figure 4:
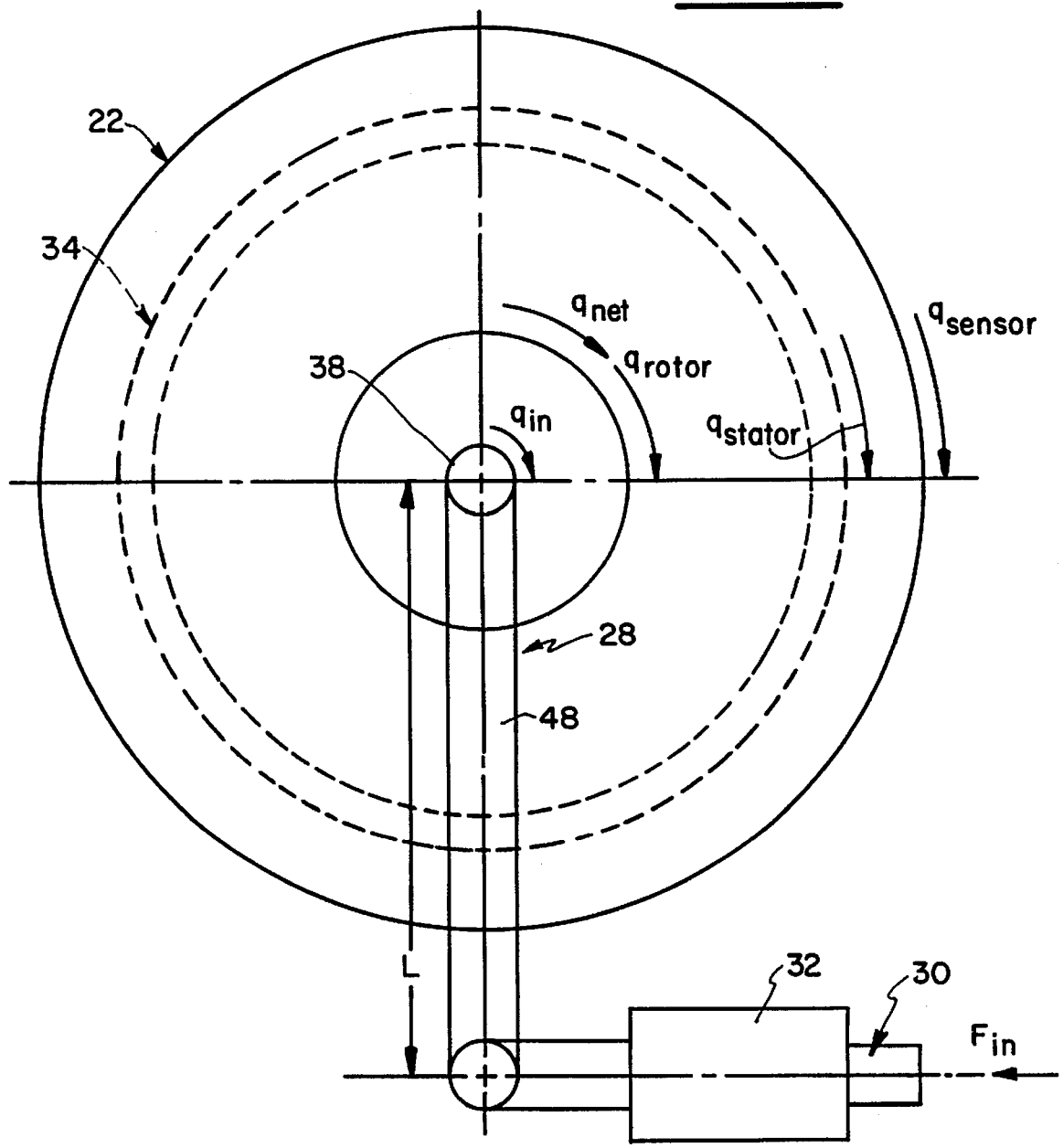
FIG. 4 shows a schematic front view of the motor and the motor torque sensor of FIG. 3.

The relationship between the force $F_{1N}$ externally applied to the load target and the torques about the motor shaft 38 will now be described with reference to FIGS. 3 and 4. FIG. 4 is a schematic front view of the actuator 20 and the torque sensor 22, including the converter 28, the shaft 30 and the target force sensor 32 in order to show the relation between the torques about the motor shaft 38 and the force $F_{1N}$.

As shown in FIG. 4, a force $F_{1N}$ applied to the load target (e.g., the force exerted by the pilot) is transmitted from the shaft 30 to the converter 28. The converter 28 converts the force $F_{1N}$ to a torque $q_{1N}$ about the motor shaft 38 according to the formula $q_{1N}=F_{1N} * L$, where L is a conversion constant (e.g., a length L of a motor output arm 48). The input torque $q_{1N}$ is added to a motor torque $q_{rotor}$ which is the torque exerted by the rotor 40 upon the motor shaft 38. The torque $q_{rotor}$ is generated by the electromagnetic interaction between the stator 36 and the rotor 40.

The net torque $q_{net}$ on the motor shaft 38 is $q_{net}=q_{1N}+q_{rotor}$. If the resultant net torque $q_{net}$ is not equal to zero, the motor shaft 38 undergoes acceleration. Since the $q_{1N}$ is determined by the force $F_{1N}$ detected by the target force sensor 32 and the conversion constant L, the torque $q_{rotor}$ needs to be measured in order to determine the acceleration of the motor shaft 38.

Since the torque $q_{rotor}$ exerted by the rotor 40 is generated by the electromagnetic interaction of the rotor 40 with the stator 36, the stator 36 exerts an equal and opposite torque $q_{stator}$ upon the motor housing 34 (e.g., $q_{stator}=-q_{rotor}$). The motor housing 34 is rigidly attached to the torque sensor 22 by the mounting bolts 44, so that the torque sensor 22 measures the reaction torque exerted by the stator 36 upon the motor housing 34, so that $q_{sensor}=-q_{stator}$. Therefore, the torque $q_{rotor}$ exerted by the rotor 40 upon the motor shaft 38 can be measured by the torque sensor 22 such that $q_{rotor}=q_{sensor}$.

Finally, because the rotor 40 is rigidly attached to the motor shaft 38, the torque $q_{motor}$ exerted by the motor shaft 38 on the converter 28 is $q_{motor}=q_{rotor}$. Therefore, the torque sensor 22 measures the motor torque $q_{motor}$ separately from the force $F_{1N}$ externally exerted on the load target upon the shaft 30.

Figure 5B:
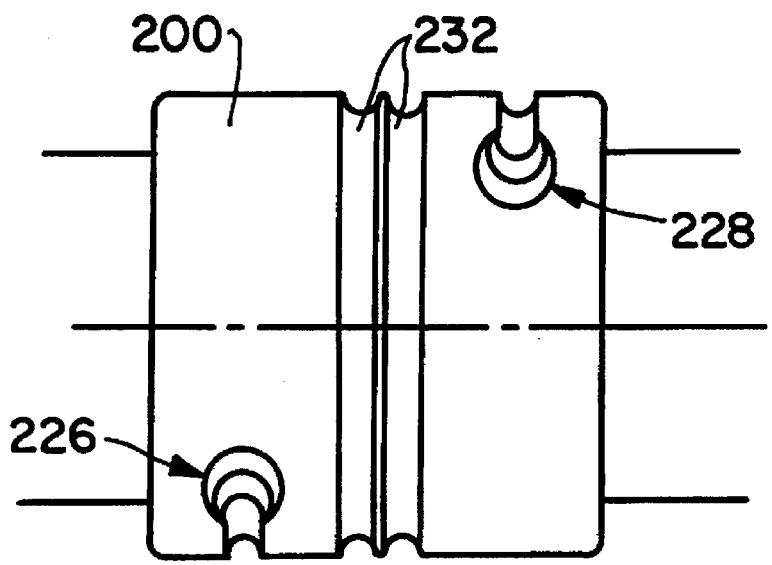
Figure 5C:
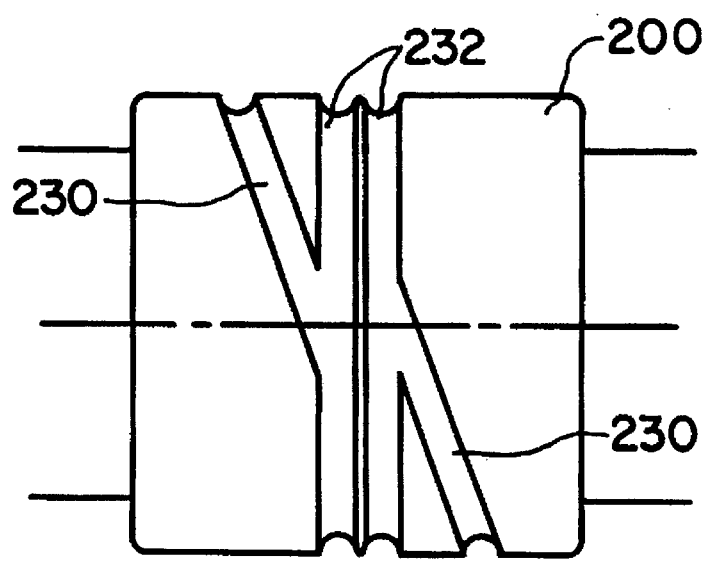

FIGS. 5A, 5B and 5C show an example of the converter 28 disclosed in FIG. 2. FIG. 5A shows a side view of the converter 28 connected to the shaft 26 and the shaft 30. The converter 28 includes a small pulley 200 fixed to the shaft 26, a large pulley 202 coupled to the shaft 30a, and an upper cable 204 and a lower cable 206 for transmitting the torque from the small pulley 200 to the large pulley 202. The upper cable 204 has a stud shank 208 which is secured to the large pulley 202 by a tensioning nut 210. Similarly, the lower cable 206 has a stud shank 212 which is secured to the large pulley 202 by a tensioning nut 214. The upper cable 204 is guided around the large pulley 202 by a first groove 216 and the lower cable 206 is similarly guided by a second groove 218 adjacent to the first groove 216. Both the first groove 216 and the second groove 218 have a sufficient depth relative to the large pulley edge 220 to prevent slipping of the upper and lower cables 204 and 206.

The upper cable 204 has an upper cable ball shank 222 and the lower cable 206 has a lower cable ball shank 224 which are secured to the small pulley 200. FIGS. 5B and 5C are front (facing toward large pulley 202) and rear (facing away from large pulley 202) views of the small pulley 200, respectively. As shown in FIG. 5B, a first ball end seat 226 and a second ball end seat 228 is provided to seat the upper cable ball shank 222 and the lower cable ball shank 224, respectively. The small pulley 200 includes primary guide grooves 230 which guide the respective cables to secondary grooves 232. The secondary grooves are disposed so that after the initial wrap of the cable, the cable within the grooves 230 and 232 form a surface level with the surface of the pulley 200, so that subsequent wraps of the cables can be made about the small pulley 200. As a result, since the small pulley 200 can accommodate a plurality of wraps by the upper cable 204 and the lower cable 206, the small pulley 200 can pull the cables with increased tension due to the additional surface area between the pulley 200 and the cables.

The tension of the cables is preferably greater than the maximum torque of the actuator 20 in order to reduce the occurrence of slipping in the cables. The tension of the respective cables can be adjusted by the tensioning nuts 210 and 214.

The large pulley 202 is coupled at one end to the member 30a by a bracket 234 and an eyebolt 236. The eyebolt 236 is rotatably coupled to the bracket 234 by a spherical bearing. The member 30a is coupled to the pilot torque sensor 32 which is in turn coupled to the member 30b. The member 30b is coupled to the load target, in this case a simulating control instrument.

The simulating control instrument includes a fixed support 238 and a pilot control stick 240 rotatably coupled to the support 238. The pilot control stick 240 is rotatably coupled to the shaft 30b at a distal end 240a and receives the external pilot force $F_{1N}$ from a proximal end 240b. Thus, as the shaft 26 rotates, the rotational torque is transferred by the cables 204 and 206, resulting in the conversion of the torque to force exerted on the pilot control stick 238. Similarly, the force $F_{1N}$ exerted by the pilot on the stick 240 is detected by the sensor 32 and transferred via the cables 204 and 206 to the shaft 26.

Figure 6:
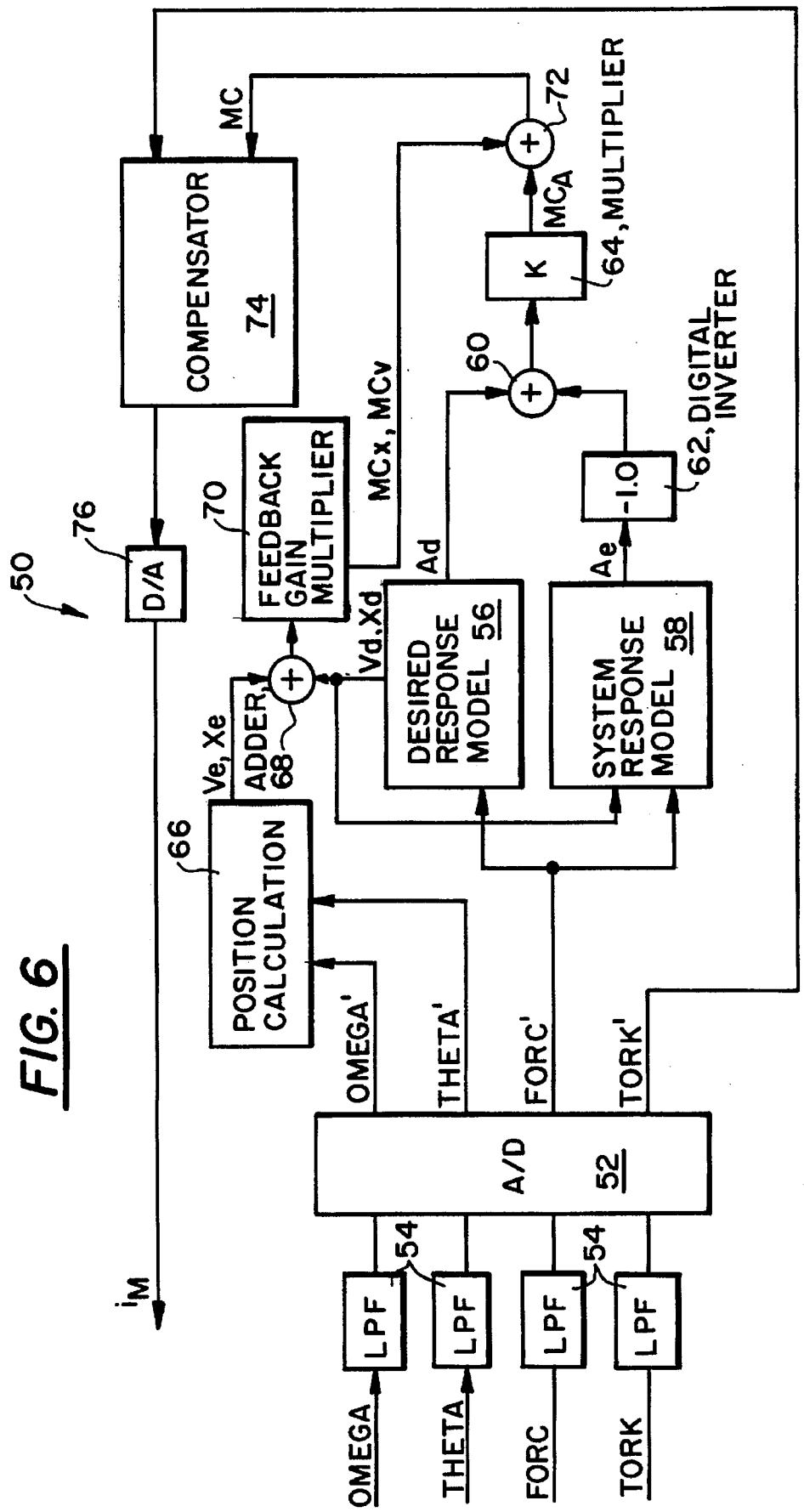
FIG. 6 shows a block diagram of the control portion of FIG. 2.

FIG. 6 shows a block diagram of the control portion 50 disclosed in FIG. 2. The control portion 50 controls the electromagnetic interaction between the stator 36 and the rotor 40 by outputting a motor current signal $i_M$. The control portion 50 generates the motor current signal $i_M$ in response to the signals OMEGA, THETA, FORC and TORK which represent the values of the angular velocity of the shaft 26, the angular position of the shaft 26, the force $F_{1N}$, and the motor torque $q_{motor}$, respectively.

The signals OMEGA, THETA, FORC and TORK are digitized by an A/D converter 52 after passing through a low pass filter 54 having, for example, a cutoff frequency of 400 Hz. The digitized FORC signal is then input to a desired response model portion 56 and a system response model portion 58. The desired response model portion 56 performs the function of determining the desired response of the device under simulation (e.g., a robot arm, a control stick for a commercial airplane, or a control stick for a helicopter) in response to the detected force $F_{1N}$ on the load target (e.g., the force exerted by a pilot in a simulator); thus, the desired response model portion 56 determines the desired acceleration $A_d$, velocity $V_d$ and position $X_d$ that the device under simulation (e.g., the pilot control stick) would undergo if that device were subject to the detected force $F_{1N}$.

The system response model portion 58 determines the expected response of the simulator system itself to the force $F_{1N}$ on the load target. In other words, the system response model portion 58 compensates for the inertia, vibration, damping, friction, etc. of the control loader system itself in determining how the actuator 20 should respond to the force $F_{1N}$. That is, the desired response model portion 56 generates an output as if the simulator itself had no mass, damping or spring loading. Since the simulator does have such characteristics, the system response model portion 58 provides feed forward compensation for such factors.

As shown in FIG. 6, the system response model portion 58 is responsive to the digitized signal FORC', the desired velocity $V_d$ and the desired position $X_d$ of the device under simulation. The system response model portion 58 outputs the expected acceleration $A_e$ of the load target that would result from the force $F_{1N}$ for a given position and velocity of the load target if the simulator were not being feedback controlled to a particular model.

The expected open-loop system acceleration $A_e$ is compared with the desired acceleration $A_d$ in an adder 60 after passing through a digital invertor 62. The resulting signal is multiplied by a constant K in a multiplier 64, which outputs a signal $MC_A$. The constant K represents the moment of inertia within the plane having the cross-section of the shaft 26 (e.g., the plane including the torque $q_{rotor}$). This signal $MC_A$ represents the motor command signal to apply the desired torque to the system for a given $F_{1N}$ as corrected by the actual simulator response. Thus, the signal $MC_A$ indicates the amount of torque necessary so that the desired system acceleration is achieved for a particular $F_{1N}$.

The digitized OMEGA' and THETA' signals are input to a position calculation means 66, which determines an expected position $X_e$ and velocity $V_e$ of the shaft 26 based upon actual measurements by angular position sensor 27 and angular velocity sensor 29. The measured velocity input to position calculation means 66 is used to eliminate any system lag in determining the position of the shaft 26 from the measured position input alone. The digitized OMEGA signal representing the angular velocity of the shaft 26 is directly output from the position calculation means 66 as an expected velocity $V_e$. The expected position and velocity signals $X_e$ and $V_e$ are compared with the desired position and velocity signals $X_d$ and $V_d$, as the desired model should respond, with regard to position and velocity, to $F_{1N}$, and the respective errors are output from an adder 68. The outputs from the adder 68 indicate the dynamic state of the system with respect to position and velocity as compared to the desired response. The position and velocity error signals from the adder 68 are multiplied by their respective feedback gains in a feedback gain multiplier 70 to output a motor command signal due to the position error $MC_X$ and a motor command signal due to velocity error $MC_V$.

The three motor command signals $MC_X$, $MC_V$ and $MC_A$ are then combined by an adder 72 and then input as a desired motor torque MC to a compensator 74. The compensator 74 generates a correction signal in response to the digitized motor torque signal TORK' and the desired motor torque MC. The correction signal is converted by a D/A converter 76 and output as the motor current signal $i_M$. Thus, the control portion 50 generates the motor current signal $i_M$ in order to correct the actual torque, velocity and position to follow the desired torque, velocity and position, respectively.

Figure 7:
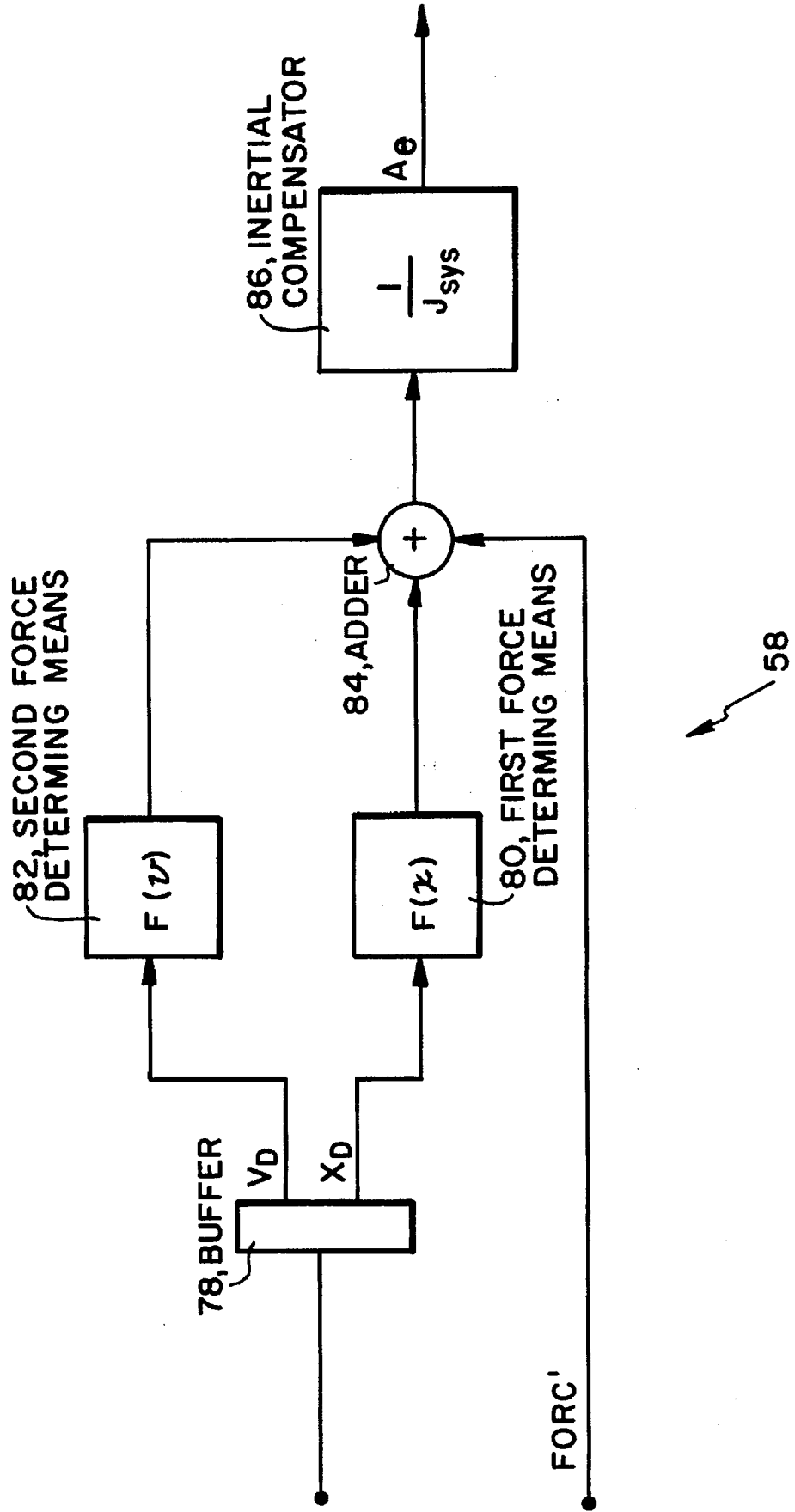
FIG. 7 shows a block diagram of a system response model of the control portion of FIG. 6.

FIG. 7 is an exemplary block diagram of the system response model portion 58 shown in FIG. 6. The system response model portion 58 determines the expected acceleration $A_e$ of the open-loop simulator itself on the basis of the measured force on the load target coupled to the actuator 20 and the desired velocity and position to an input force $F_{1N}$ as determined by desired response model 56. In this embodiment, the signal FORC' represents the digitized measured force signal from the A/D converter 52. In order to provide system stability (see below), the desired velocity and position signals $V_D$ and $X_D$ are used as the velocity and position of the load target, as opposed to the signals OMEGA' and THETA'. After passing through a buffer 78, the position signal $X_D$ is input to a first force determining means 80 and the velocity signal $V_D$ is input to a second force determining means 82. The first force determining means 80 determines a first force (or torque) as a function of position in order to characterize, for example, the nonlinear spring forces within the simulator itself. The second force determining means 82 determines a second force (or torque) as a function of velocity in order to characterize, for example, the damping or frictional response within the simulator itself. Thus, the first force determining means 80 and the second force determining means 82 output the response of the simulator itself, scaled as torques, in order to compensate for factors such as vibration, ripple, damping, friction, etc. within the actuator 20 or the associated mechanical linkages. The first force determining means 80 and second force determining means 82 may be, for example, either microprocessor-based logic circuits or ROM look-up tables.

The outputs of the first force determining means 80 and the second force determining means 82 are scaled as torques and are input to an adder 84, along with the signal FORC' representing the force from the target force sensor 32. Since the target force $F_{1N}$ and the system torques must overcome the total mass within the simulator itself, the total torque value output from the adder 84 is divided in an inertial compensator 86 by a system inertia factor $J_{sys}$, which represents the mass of the system about the shaft 26. As a result, the inertial compensator 86 outputs the expected acceleration of the system $A_e$, that is, the acceleration of the simulator itself. The values to be output by the first force determining means 80, the second force determining means 82 and the inertial compensator 86 may be determined by experimental measurements of the system.

Figure 8:
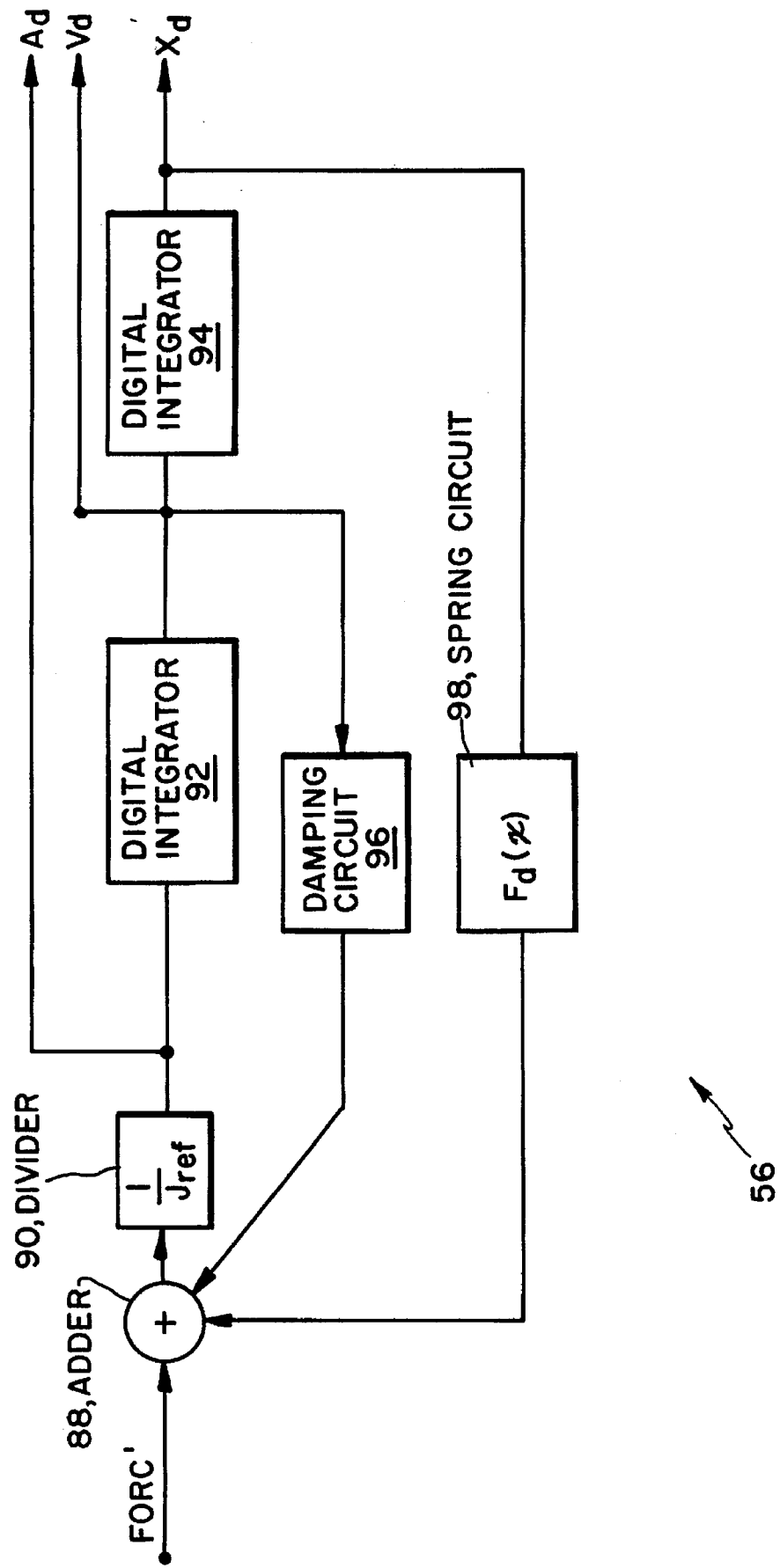
FIG. 8 shows a block diagram of a desired response model of the control portion of FIG. 6.

FIG. 8 is an exemplary block diagram of the desired response model portion 56 disclosed in FIG. 6. The desired response model portion 56 outputs a command indicating the desired response which the actuator is to apply to the load target in a given simulation environment, for example, the response of a control stick in a Boeing 767 aircraft. As shown in FIG. 8, the desired response model portion 56 includes a second order response function for a given model responsive to the force signal FORC'. An output of an adder 88 is divided by a reference inertia $J_{ref}$ in a divider 90 in order to obtain the desired acceleration of the system $A_d$. The desired acceleration signal $A_d$ is passed through a digital integrator 92 in order to obtain the desired velocity response $V_d$. Similarly, the velocity signal $V_d$ is passed through a digital integrator 94 in order to obtain the desired position response $X_d$. As a matter of design, the dynamic values for acceleration, velocity and position may be expressed in angular or linear terms, so long as the application throughout is consistent.

The velocity signal $V_d$ passes through a damping circuit 96 in order to generate a model torque (or force) as a function of the desired velocity; similarly the position signal $X_d$ passes through a spring circuit 98 in order to generate a model torque (or force) as a function of the desired position. These dynamic forces are then added in the adder 88 with the detected load target force FORC' to obtain the dynamic response of the desired system in terms of $A_d$, $V_d$, and $X_d$. The parameters which enable the desired response model portion 56 disclosed in FIG. 8 to generate the desired response may be determined theoretically or by actual measurement of a device to be simulated.

It should be noted that although the desired response model portion 56 and the system response model portion 58 are characterized as second order systems, one skilled in the art would appreciate that higher order systems could be used to more accurately characterize either actual or desired system responses.

Figure 9:
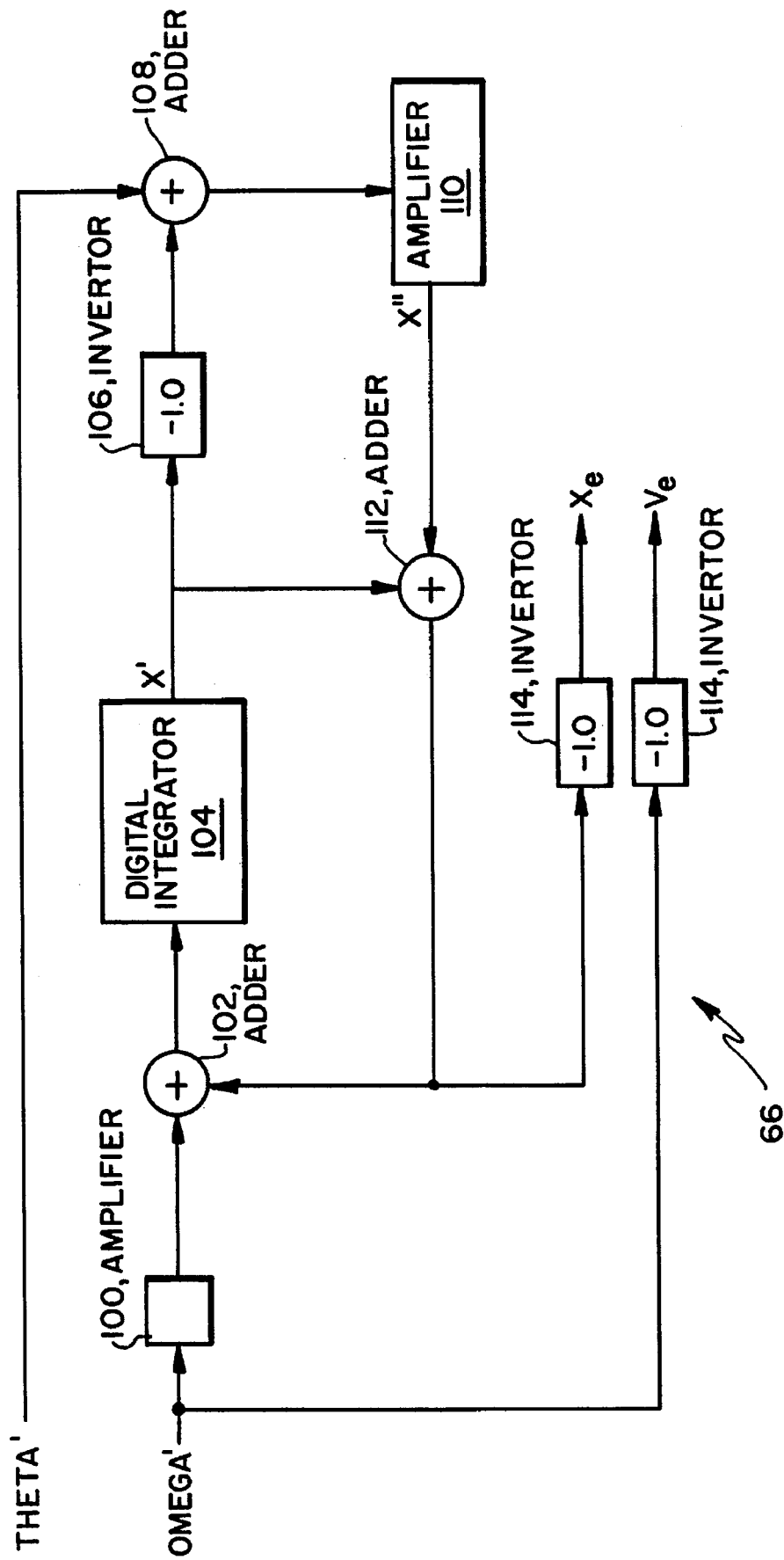
FIG. 9 shows a block diagram of an estimator of the control portion of FIG. 6.

FIG. 9 shows an exemplary block diagram of the position calculation means 66 disclosed in FIG. 6. The position calculation means 66 may be embodied as a Kalman filter that considers the position THETA' as a state measurement and the angular velocity OMEGA' as a measured disturbance. The position calculation means 66 improves the measured value of the position of the load target by optimizing the measured position THETA' with respect to the rate of change in position OMEGA'. By improving the position signal, better resolution is obtained with reduced noise, and any positional lag within the system can be reduced. As a result, the system according to the present invention can generate a more accurate response where position of the load target is critical. For example, if the A/D converter 52 outputs a twelve bit digital signal, the result of the position calculation means 66 improves noise and improves the sensor resolution. As a result, the feedback error is minimized.

As shown in FIG. 9, an amplifier 100 multiplies the digitized OMEGA' signal with a predetermined gain and outputs the result to an adder 102. The OMEGA' signal is also inverted by an invertor 114 and output as expected velocity $V_e$ for comparison with the desired velocity $V_d$ from the desired response model portion 56 of FIG. 6. The output of the adder 102 is integrated by a digital integrator 104 in order to provide a signal X'. The value X' is inverted by an invertor 106 and the result is added to the digital signal THETA' by an adder 108. The output of the adder 108 is multiplied by a predetermined gain by an amplifier 110 and added to the signal X' by an adder 112. Thus, the adder 112 outputs an improved position signal, which is inverted by the invertor 114 for comparison with the desired position signal $X_d$.

FIG. 10 shows a block diagram of the compensator 74 disclosed in FIG. 6. The compensator 74 generates a motor current signal $i_M$ related to the difference between the actual torque and the desired torque. A torque error signal from an adder 116 is filtered by a digital filter 118, and multiplied by a constant in an amplifier 120. The output of the amplifier 120 is added to the motor control error signal MC by an adder 122 and the result is biased by a feedforward amplifier 124 to obtain the motor current signal $i_M$. The feedback filtering system of the compensator 74 has a high gain at low frequencies (e.g., below 10 Hz) and a low gain at higher frequencies. The high gain below frequencies of 10 Hz attenuates motor torque generation errors, such as ripple torque, whereas the reduced gain at higher frequencies (e.g., 50–150 Hz) ensures stability of the system. Further, the reduced gain eliminates stability problems where the system resonance frequency is above 50 Hz.

Operation of the control portion 50 disclosed in FIG. 6 will now be described. In this embodiment, it is assumed that the load target is a control stick for a flight simulator, although any second order system may be used as the load target to be coupled to the shaft 30. The control portion 50 is preloaded with initial conditions and system constants, as described above, and also the necessary parameters for the desired flight simulation control stick. The input signals OMEGA, THETA, FORC and TORK represent angular velocity of the shaft 26, angular position of the shaft 26, the detected force $F_{IN}$ exerted by the simulator stick on the shaft portion 30b, and the torque exerted by the actuator 20, respectively. It should be noted that these four sensors are for a single dimension of movement; if the simulator stick is to have two-dimensional movement, an additional set of four sensors would be required.

As the flight simulator stick is engaged, the four input signals OMEGA, THETA, FORC and TORK are filtered through the low pass filter 54 in order to prevent aliasing of high frequency noise which may affect the analog-to-digital conversion by the A/D converter 52. The filtered signals are digitized, for example, into twelve (12) bit digital signals at a sampling rate of 1000 Hz. The desired response model portion 56 outputs a desired response of the system (e.g., $A_d$, $V_d$ and $X_d$) based upon the digitized FORC signal from the target force sensor 32. Since the shaft 30 is coupled to the simulator stick, any desired response of the system will be conveyed to the simulator stick so that the pilot will feel the desired response on the simulator stick from the force $F_{IN}$ which he applies to the simulator stick.

The system response model portion 58 determines the expected acceleration response $A_e$ of the system coupled to the simulator stick, and the position calculation means 66 determines the expected position $X_e$ of the system. The adder 68 and the feedback gain multiplier 70 determine the amount of additional torque which needs to be applied, preferably for a predetermined time interval, in order to correct the velocity and the position of the shaft 26 with respect to the desired velocity and position. Similarly, the adder 60 and the multiplier 64 determine the amount of additional torque which needs to be applied steady state in order to correct the acceleration of the shaft 26.

The motor control signal MC is input with the measured torque signal TORK' into the compensator 74, which generates a digital torque signal after filtering the feedback noise. A D/A converter 76 converts the digital torque signal to the analog current signal $i_M$, which drives the actuator 20. Thus, the torque generated by the actuator 20, $q_{motor}$, is corrected in accordance with the desired response and the actual response of the system in order to control the acceleration, velocity and position of the simulator stick.

As shown in FIG. 6, the correction of the desired acceleration in the desired response model portion 56 with the feed forward estimated acceleration from the system response model portion 58 enables the force feedback loop to have an improved dynamic response. In addition, the feed forward portion of the feedback system shown in FIG. 6 greatly improves ripple torque attenuation. Ripple torque is the variation in force output of an electric motor as a function of position, given a constant motor current. It is due to the fact that the distance between the rotor and stator poles increase and decrease as the rotor moves past the stator. Thus, when the rotor poles are closer to the stator poles, the force produced is higher even though current through the motor winding is the same.

Thus, the characteristics of ripple torque can be included in the response function shown in FIG. 7, thereby correcting ripple torque.

Another feature of the present invention is the ability to determine whether a force on a system is due to a force $F_{1N}$ or the actuator 20. Thus, the tracking of the actual system response with the desired system response is dramatically improved. Further, if a desired system (e.g., a simulation of a helicopter) has a lower physical inertia than the system inertia (e.g., the actuator 20 and the associated mechanical linkages), the control system of the present invention can overcome its own inertia by exerting a torque in the same direction as the target force $F_{1N}$. As a result, a relatively bulky control system is able to effectively provide a simulation of a system having little inertia.

Of course, the disclosed embodiment of the present invention maybe varied considerably. One variation is replacing the actuator 20, which is electric, with a hydraulic actuator. While this has the advantage of eliminating the need to correct for ripple in the electric motor, the hydraulic actuator is not as responsive; further, if a desired response of the simulator stick is a massless system having an inertia less than the system's inherent inertia, the hydraulic actuator is unable to "help" the pilot by exerting a torque in the same direction as the force $F_{1N}$. Nevertheless, the use of the force sensor and the torque sensor improves the response of the hydraulic actuator when compared to prior art systems.

Since the electrical current supplied to the actuator 20 corresponds to the torque exerted by the actuator 20, the torque sensor 22 may also be modified by replacing the strain gauge within the torque sensor 22 with a current sensor which measures the motor current used from the current $i_M$ supplied to the actuator 20. This would be desirable where an actuator 20 is replaced with a servo disc motor having a plurality of rotors in applications requiring less force.

Finally, the relative positions of the torque sensor 22 and the target force sensor 32 can be rearranged so long as the force from the actuator 20 can be determined separately from the force $F_{1N}$. Therefore, a first force sensor would be needed on one side of a substantial mass, and a second sensor would be needed on the other side of the mass. By placing two force sensors on the opposite side of the mass, the actuator force can be separated from the force externally applied to the target object.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An aircraft simulator device comprising:
   a simulating control instrument responsive to a force applied by a pilot and a controlled load;
   first detecting means for detecting said force applied by said pilot, said first detecting means being coupled to said simulating control instrument and outputting a force signal;
   an actuator for exerting said controlled load on said simulating control instrument in response to a control signal, said actuator having a first end coupled to said simulating control instrument;
   second detecting means for detecting said controlled load exerted by said actuator, said second detecting means being coupled to a second end of said actuator and outputting a torque signal in response to said detected controlled load; and
   control means for generating said control signal in response to said force signal and said torque signal, said control signal being generated so that said actuator controls said simulating control instrument in accordance with a desired relation of a simulated control instrument of a simulated aircraft to said force applied by said pilot.

2. An aircraft simulator device as recited in claim 1, further comprising a host computer for controlling said aircraft simulator device and for storing a plurality of desired relations corresponding to respective aircraft.

3. An aircraft simulator device as recited in claim 2, wherein said host computer comprises means for recreating said force applied by said pilot in accordance with said simulated aircraft.

4. An aircraft simulator device as recited in claim 3, further comprising:
   means for detecting a position of said simulating control instrument and outputting a position signal;
   means for detecting a velocity of said simulating control instrument and outputting a velocity signal; and
   wherein said control means generates said control signal in response to said position and velocity signals.

5. An aircraft simulator device as recited in claim 1, wherein:
   said control means generates said control signal in response to a desired response signal and a system response signal;
   said desired response signal is based on said force applied by said pilot and said desired relation to said force applied by said pilot; and
   said system response signal is based on selected system factors of said aircraft simulator device.

6. An aircraft simulator device as recited in claim 5, further comprising a host computer for controlling said aircraft simulator device and for storing a plurality of desired relations corresponding to respective aircraft.

7. An aircraft simulator device as recited in claim 6, wherein said host computer comprises means for recreating said force applied by said pilot in accordance with said simulated aircraft.

8. An aircraft simulator device as recited in claim 7, further comprising:
   means for detecting a position of said simulating control instrument and outputting a position signal;
   means for detecting a velocity of said simulating control instrument and outputting a velocity signal; and
   wherein said control means generates said control signal in response to said position and velocity signals.

9. A method for simulating an aircraft in response to a force applied by a pilot, comprising the steps of:
   detecting said force applied by said pilot onto a simulating control instrument;
   detecting a position of said simulating control instrument;
   detecting a velocity of said simulating control instrument;
   detecting a torque applied by an actuator onto said simulating control instrument;
   determining a desired response of a simulated control instrument of said simulated aircraft based on said detected force applied by said pilot;
   determining an actual response of said simulating control instrument based on said detected force applied by said pilot, said detected position, and said detected velocity; and
   controlling said actuator to generate said torque on said simulating control instrument so that said detected torque approaches said desired response as corrected by said actual response.

* * * * *